(12) United States Patent
Mazo et al.

(10) Patent No.: US 6,399,715 B2
(45) Date of Patent: Jun. 4, 2002

(54) SOLUTION POLYMERIZING ASPARTIC ACID AND MONOMER TO FORM SUCCINIMIDE COPOLYMER

(75) Inventors: Grigory Ya. Mazo, Wilmette; Robert J. Ross, Elmhurst; James F. Kneller, LaGrange Park; Jacob Mazo, Wilmette, all of IL (US)

(73) Assignee: Donlar Corporation, Bedford Park, IL (US)

( * ) Notice: Subject to any disclaimer, the term of this patent is extended or adjusted under 35 U.S.C. 154(b) by 0 days.

(21) Appl. No.: 09/799,230

(22) Filed: Mar. 5, 2001

Related U.S. Application Data

(60) Division of application No. 09/357,682, filed on Jul. 20, 1999, now Pat. No. 6,197,897, which is a division of application No. 09/006,255, filed on Jan. 13, 1998, now Pat. No. 5,939,517, which is a continuation-in-part of application No. 08/808,467, filed on Mar. 3, 1997, now Pat. No. 5,756,595.

(51) Int. Cl.[7] .............................................. C08G 73/10
(52) U.S. Cl. ....................... 525/420; 524/608; 528/274; 528/286; 528/289
(58) Field of Search ......................... 524/608; 525/420; 528/274, 286, 289

(56) References Cited

U.S. PATENT DOCUMENTS

| | | | |
|---|---|---|---|
| 5,484,945 A | 1/1996 | Nagatomo et al. | 548/520 |
| 5,508,434 A | 4/1996 | Batzel et al. | 548/520 |
| 5,610,208 A | * 3/1997 | Diaroku et al. | 525/384 |
| 5,610,264 A | * 3/1997 | Wood et al. | 525/420 |

* cited by examiner

*Primary Examiner*—Robert E. L. Sellers
(74) *Attorney, Agent, or Firm*—Olson & Hierl, Ltd.

(57) ABSTRACT

A method for the preparation of a succinimide copolymer by the catalytic co-polymerization of aspartic acid with a selected polyfunctional monomer in the presence of a cyclic carbonate solvent. Succinimide copolymers of relatively high weight average molecular weight and high purity can be produced in relatively high yields while employing a relatively low catalyst loading.

1 Claim, No Drawings

SOLUTION POLYMERIZING ASPARTIC ACID AND MONOMER TO FORM SUCCINIMIDE COPOLYMER

CROSS-REFERENCE TO RELATED APPLICATIONS

This application is a division of application Ser. No. 09/357,682, filed Jul. 20, 1999, now U.S. Pat. No. 6,197,897, which, in turn, is a division of Ser. No. 09/006,255, filed Jan. 13, 1998, now U.S. Pat. No. 5,939,517, which, in turn, is a continuation-in-part of U.S. Ser. No. 08/808,467, filed Mar. 3, 1997, now U.S. Pat. No. 5,756,595.

FIELD OF THE INVENTION

This invention relates to a method for the production of succinimide copolymers by the catalytic co-polymerization of aspartic acid with another monomer.

BACKGROUND OF THE INVENTION

Polysuccinimides, polyaspartates and copolymers thereof are useful as mineral scale inhibiting agents, nutrient absorption enhancers, additives for cosmetics and personal care products, adhesives, anti-redeposition agents for detergents, dispersants, additives for paper making, corrosion inhibitors, metal working fluids, lubricants for conveyor belts, additives for the prevention of encrustation in sugar manufacture, and tartar preventative agents in toothpaste.

Methods are known for the production of polysuccinimide by the polymerization of aspartic acid in the presence of various catalysts, such as phosphoric acid and sulfur-containing dehydrating agents and the like. However, these prior art methods rely on an inefficient process of heat transfer during polymerization, namely the heating of an unstirrable melt. Another disadvantage to these methods is the large amount of catalyst and/or dehydrating agent which is required for polymerization to occur and the subsequent removal of the excess catalyst.

Attempts to perform catalytic polymerizations as stirrable, liquid reactions have been made, but again exceedingly high amounts of catalyst were required to achieve the polymerization of desirable high molecular weight products (U.S. Pat. No. 5,484,945 to Nagatomo et al.).

There is an ongoing need therefore, for a commercially acceptable, convenient method of catalytically polymerizing aspartic acid to polysuccinimide and succinimide copolymers in high yield, purity and of desired, relatively high molecular weight. The present inventive method satisfies this need, provides a useful product and overcomes the disadvantages of the prior art methods.

SUMMARY OF THE INVENTION

An efficient solution-phase method of succinimide copolymer production is disclosed. A liquid reaction mixture containing at least one cyclic carbonate solvent, at least one catalyst, and aspartic acid, optionally together with another polymerizable monomer, is initially prepared. Preferably, the weight ratio of aspartic acid/catalyst is greater than about 1.

The resulting reaction mixture is heated to an elevated temperature which is below the boiling point of the solvent but is sufficient to effect the catalytic polymerization of the aspartic acid in solution. Thereafter, the temperature is maintained for a sufficient time period until a succinimide copolymer with another polymerizable monomer is produced. Succinimide copolymers of relatively high weight average molecular weight and high purity can be produced in relatively high yields even when relatively low ratios of catalyst are employed.

The succinimide copolymers so produced can be recovered by precipitation with a triturating solvent, and hydrolyzed to a polyaspartic acid derivative if desired.

The inventive process requires only a single, stirred, reactor vessel thereby avoiding the problems of prior multi-step methods with handling and recovering the product from semi-solid melts. The inventive method provides a succinimide copolymer in relatively high yields and of relatively high purity.

DETAILED DESCRIPTION OF THE INVENTION

Aspartic acid and at least one catalyst can be dissolved in at least one cyclic carbonate solvent and can be co-polymerized with another monomer, as well as homopolymerized with itself, in solution by the application of heat, the temperature being maintained below the boiling point of the solvent. The aspartic acid can be in any of its L-, D-, and DL-isomer forms. Relatively low catalyst loadings can be used. The term "relatively low catalyst loadings" as used herein means that the ratio of aspartic acid/total catalyst on a solids weight/weight (w/w) basis is greater than about 1.

As presently practiced, the inventive method can produce a succinimide copolymer having a weight average molecular weight (Mw) in the range of about 700 to about 100,000. The molecular weight can be controlled by varying one or more of the following reaction conditions: co-monomer, solvent, concentration of reactants, polymerization temperature, polymerization time, reaction pressure, water removal rate, catalyst, and weight ratio of aspartic acid monomer to catalyst. The term "succinimide copolymer" as used herein and in the appended claims includes polysuccinimide copolymers with another monomer moiety as well as random copolymers constituted by succinimide units with another monomer.

Cyclic carbonate solvents useful in the inventive method preferably have a boiling point in the range of about 150° C. to about 300° C. Cyclic carbonates presently include cyclic organic esters having the formula:

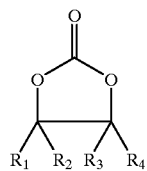

wherein $R_1$, $R_2$, $R_3$ and $R_4$ are independently hydrogen, or alkyl (1 to 20 carbon atoms inclusive), aryl, or hydroxymethyl or chloromethyl.

In a particularly preferred method embodiment, the cyclic carbonate solvent is unreactive with respect to aspartic acid and the monomer to be copolymerized, can solubilize the product succinimide copolymer, and is commercially available at reasonable cost.

Presently preferred solvents are cyclic alkylene carbonates. Examples include ethylene carbonate, propylene carbonate, butylene carbonate, glycerin carbonate, and mixtures thereof. Many such cyclic carbonates are commercially sold under the trademark JEFFSOL® by Huntsman Corporation, Austin, Texas.

The reaction mixture can be formed by combining in a cyclic carbonate solvent, aspartic acid and at least one desired co-polymerizable monomer in the presence of a polymerization catalyst. The copolymerizable monomer has a functionality of at least 2. Suitable monomers for the present purposes are those that are soluble in the cyclic carbonate solvent that is utilized as the reaction medium in any given instance and that possess. the desired polyfunctionality. Preferred monomers are poly(carboxylic acids), aminocarboxylic acids, mercaptocarboxylic acids, sulfocarboxylic acids, phosphonocarboxylic acids, phosphinocarboxylic acids, hydroxy-carboxylic acids, diamines and triamines. Mixtures of the aforementioned polyfunctional monomers can also be used to produce succinimide copolymers having properties tailored for a particular purpose.

The order of addition is not important so long as a substantially liquid reaction mixture is obtained with heating. The temperature must be sufficiently high to initiate polymerization of the aspartic acid and will vary with operating conditions. Preferably, the elevated temperature remains below the boiling point of the chosen cyclic carbonate solvent. The elevated temperature is in the range of about 140° C. to about 220° C. Preferably the reactants remain in solution during the whole course of the polymerization reaction. Reaction times can vary in the range of about 5 minutes to about 24 hours, preferably about 30 minutes to about 12 hours.

Succinimide copolymer product is obtained in relatively high yields of about 40% to about 100% and with relatively high purity of about 70% to about 100%.

The reaction pressure can be atmospheric (air or inert gas) or sub-atmospheric. The gas is preferably anhydrous nitrogen, or carbon dioxide and can be passed through the reactor.

The succinimide copolymer product can be linear or branched, can be a random copolymer as well as a block copolymer or a graft linear copolymer, and is recovered by precipitation through the addition of a triturating solvent which is miscible with the cyclic carbonate solvent but is non-solvating for the polysuccinimide product. Useful triturating solvents include, but are not limited to, ketones, alcohols, esters, nitrites, water, and hydrocarbons. Acetone is particularly preferred. The succinimide copolymer product can also be isolated by other solvent separation techniques, such as flash evaporation or distillation.

The succinimide copolymers produced by the present inventive methods can be used directly or can be hydrolyzed to produce corresponding polyaspartate derivatives.

Catalysts useful for the aspartic acid co-polymerizations include, without being limited to, known phosphorus-containing catalysts, sulfur- and oxygen-containing dehydrating agents and mixtures thereof and catalysts disclosed in U.S. Pat. No. 5,508,434 (Batzel et al.), incorporated herein by reference.

Examples of phosphorus-containing catalysts include phosphoric acid, polyphosphoric acid, phosphorous acid, and hypophosphorous acid, as well as mixtures of the foregoing. Examples of sulfur- and oxygen-containing dehydrating agents include sulfur trioxide anhydride and sulfur trioxide precursors, complexes of sulfur trioxide with amines or amides, alkyl sulfonic acids, aryl sulfonic acids, alkali, alkaline earth, and amine salts of alkyl sulfonic acids, aryl sulfonic acids, anhydrosulfuric acids and salts thereof, sulfurous acid, and alkali, alkaline earth, or amine salts of sulfurous acid.

Particularly preferred sulfur trioxide precursors include sulfur oxygen acids, organic amine salts and inorganic salts of sulfur oxygen acids, coordinations complexes of sulfur trioxide and aliphatic amines or heterocyclic amines, complexes of sulfur trioxide and water-miscible aprotic solvents and mixtures thereof.

Preferred sulfur oxygen acids are sulfuric acid, fuming sulfuric acid, polysulfuric acid, and inorganic or organic salts and mixtures thereof.

Mixtures of more than one catalyst may be used in the methods of the present invention. The use of such mixtures of catalysts may be advantageous for economic reasons and for the production of desired molecular weight succinimide copolymers.

Suitable co-monomers with aspartic acid are saturated as well as unsaturated poly(carboxylic acids), hydroxycarboxylic acids, aminocarboxylic acids including aminoalkylcarboxylic acids as well as aminoaryl carboxylic acids, mercaptocarboxylic acids, sulfocarboxylic acids, phosphonocarboxylic acids, phosphinocarboxylic acids and organic diamines or triamines, as long as the selected co-monomer is soluble in the solvent that is utilized as the copolymerization medium.

Organic primary or secondary amines can be utilized for end-capping, i.e., chain termination, purposes and also to graft a pendant chain onto the produced polymer backbone.

Illustrative saturated poly(carboxylic acids) are adipic acid, 1,2,3,4-butanetetracarboxylic acid, decanedioic acid, pentane-1,3,5-tricarboxylic acid, phthalic acid, and the like. Illustrative unsaturated poly(carboxylic acids) are maleic acid, fumaric acid, aconitic acid, and the like.

Among suitable substituted carboxylic acids illustrative are hydroxycarboxylic acids such as lactic acid, citric acid, tartaric acid, and the like. Illustrative aminocarboxylic acids are the naturally-occurring α-amino acids such as glutamic acid, and the like, amino acid dimers such as cystine

(Cys Cys)

lanthionine (Ala-Cys), cystathionine (Ala-Hcy), and the like, aminoalkylcarboxylic acids such as aminobutyric acid, and the like, aminoarylcarboxylic acids such as aminobenzoic acid, and the like. Illustrative mercaptocarboxylic acids are 3-sulfanylpropanoic acid, and the like, as well as homocysteine, and the like. Illustrative sulfocarboxylic acids are 5-sulfosalicylic acid, 5-sulfoisophthalic acid, 4-sulfophthalic acid, sulfosuccinic acid, and the like. Illustrative phosphonocarboxylic acids are phosphonosuccinic acid, 2-phosphorus-1,2,4-butanetricarboxylic acid (commercially available under the designation "Bayhibit" from Bayer Corporation, Elkhart, IN, U.S.A.), D,L-2-amino-4-phosphonopropionic acid, and the like. Illustrative phosphinocarboxylic acids are phosphinosuccinic acid, and the like.

Relatively low catalyst loadings were found to produce succinimide copolymers of relatively high weight average molecular weight (Mw). The ratio of aspartic acid/catalyst on a solids basis varied in a range of from about 1/1 w/w to about 40/1 w/w. The specific ratio employed varied depending on the operating conditions and Mw desired as described in the Examples listed below. A preferred aspartic acid/catalyst ratio is from about 3.5/1 w/w to about 20/1 w/w.

The present inventive method advantageously employs a one-pot reaction. The reactants are added to the cyclic carbonate solvent forming a mixture which is then heated to dissolve the reactants and to initiate the polymerization reaction. The reaction can be carried out in a conventional heated and stirred reactor. Such reactors are relatively inexpensive, commonly available, and allow high production rates in small plant areas. Recovery of the succinimide copolymer can be accomplished by employing simple precipitation or like techniques.

During the polymerization reaction, the water of condensation preferably is removed by employing a condenser. The use of reduced pressure, about −88 kPa, during the polymerization reaction allows for faster removal of water, thereby promoting faster reactions resulting in higher molecular weight products.

The use of solution polymerization in the inventive method allows a much higher degree of control in the selection of the molecular weight of the product. Since low amounts of catalyst can be used, the use of more expensive, efficient catalysts is permitted without significant cost increases. The consistency and homogeneity of the reaction product is also greatly improved. As presently practiced, the inventive method produced succinimide copolymers of very low to no color. Polyaspartate derivatives derived therefrom by hydrolysis were also generally of low color.

In the practice of the inventive method, the reaction mixture can be formed by initially adding the aspartic acid and the co-monomer to a mixture of solvent and catalyst, then heating the resulting reaction mixture. In addition, the catalyst can be added to a mixture of the solvent, aspartic acid and co-monomer; or co-monomer may be added to a mixture of aspartic acid, catalyst and solvent. The solvent may optionally be preheated prior to addition of the aspartic acid, co-monomer or catalyst.

The following Examples employ generally preferred materials to further illustrate the inventive method but are not intended to be limiting. In each of the Examples, L-aspartic acid (Nanjing Jinke, China) was employed. The formation of polysuccinimide was confirmed by Infrared Spectroscopy (IR) analysis. Unless indicated otherwise, the solid reaction product was collected by filtration, weighed, and the yield as a percentage of theoretical yield was calculated.

The molecular weight of the polysuccinimide or its derivatives produced was determined by base hydrolysis of the polysuccinimide with aqueous sodium hydroxide forming the sodium salt of polyaspartic acid. The number average molecular weight (Mn), weight average molecular weight (Mw), and the Z-average molecular weight (Mz) of the sodium polyaspartate were determined by Gel Permeation Chromatography (GPC) analysis measured with reference to polyacrylate standards. The percent aspartic monomer was determined by titration with perchloric acid in a mixed solvent of acetic acid and formic acid (reference: Amino Acids and Related Compounds. Specification/General Tests; Kyowa Hakko; 3rd Ed., Kogyo Co., Tokyo, Japan, pg. 88–89). The purity of the polysuccinimide products was determined by subtracting the monomer content from about 100%. Lack of excess crosslinking in the polymer product was determined by NMR spectroscopy.

EXAMPLES 1–4

Examples 1–4 illustrate the preparation of polysuccinimide in cyclic propylene carbonate (PC) solvent by polymerizing aspartic acid under an inert nitrogen gas atmosphere with a phosphoric acid catalyst employing a weight/weight (w/w) ratio of aspartic acid to catalyst (asp/cat) varying in a range from about 1/1 to about 14.5/1.

In each of Examples 1–4, the following general procedure was employed with the respective amounts of components shown in Table I.

First, propylene carbonate (PC) solvent (JEFFSOL® PC, Huntsman Corporation, Austin, Texas) was placed in a stirred reactor flask of about 50 ml capacity. The reactor was equipped with a magnetic stirring bar, a thermometer, a water removal condenser, and a port for introducing anhydrous nitrogen gas.

Next, phosphoric acid catalyst (85 weight % in water) was added to the PC solvent with stirring to form an acidic solution. Aspartic acid was then added to the acidic solution with stirring to form a reaction mixture having the respective aspartic acid/catalyst weight ratios shown in Table I.

TABLE I

| Ex. No. | PC Solvent (Grams) | $H_3PO_4$ Catalyst (Grams) | Aspartic Acid (Grams) | Asp/Cat Ratio (w/w) |
|---|---|---|---|---|
| 1 | 15.04 | 3.01 | 3.01 | 1.18 |
| 2 | 15.29 | 0.55 | 3 | 6.42 |
| 3 | 15 | 0.6 | 5.01 | 9.82 |
| 4 | 15.02 | 0.59 | 7.06 | 14.08 |

PC = propylene carbonate

Nitrogen gas flow through the flask was begun and the temperature of the reaction mixture was elevated to about 180° C. and maintained under stirring for a polymerization period of about 2 hours. During this polymerization period, it was noted that all solids dissolved and a homogeneous solution was formed.

At the end of the polymerization period, the temperature of the reaction mixture was cooled to ambient temperature, about 25° C. The product was then triturated with acetone in an amount of about 250 ml or sufficient to cause precipitation. The precipitate was recovered by filtration and was washed with water then acetone. The solid was dried in a vacuum oven at a temperature of about 60° C. for about 1 hour.

The identity of the product was confirmed as polysuccinimide by Infrared Spectroscopy (IR) analysis. The color of the polysuccinimide product was noted. A portion of the product was hydrolyzed to sodium polyaspartate by reaction with aqueous sodium hydroxide at ambient temperature.

The sodium polyaspartate solution was then analyzed for number average molecular weight (Mn), weight average molecular weight (Mw), and Z-average molecular weight (Mz) by Gel Permeation Chromatography (GPC) relative to sodium polyacrylate standards. Based on the weight of the product, the percent theoretical yield was calculated, and the percent purity of the polysuccinimide was determined. The results for each of Examples 1–4 are shown in Table II.

TABLE II

| Ex. No. | Mn | Mw | Mz | % Purity | % Yield | Color |
|---|---|---|---|---|---|---|
| 1 | 4042 | 10575 | 18055 | 98.47 | 88.8 | light yellow |
| 2 | 4585 | 13993 | 24704 | 98.82 | 83 | white |
| 3 | 5144 | 17231 | 30330 | 99.56 | 96.8 | white |
| 4 | 4536 | 15130 | 27834 | 98.83 | 99.8 | light yellow |

As shown by the data in Table II, polysuccinimide was produced having a Mw greater than about 10,000, a purity greater than about 98%, substantially no color or low color and relatively high yields of about 80% to about 100%.

EXAMPLES 5–7

Each of Examples 5–7 illustrates the preparation of polysuccinimide in propylene carbonate (PC) solvent (JEFFSOL® PC) by polymerizing aspartic acid with phosphoric acid at a ratio of aspartic acid/catalyst varying from about 3.4/1 w/w to about 3.5/1 w/w under varying atmospheres as described in Table III.

In each of Examples 5–7, the following procedure was employed. The PC solvent was placed in a flask of about 50 ml capacity equipped with a magnetic stirring bar, a thermometer, a condenser, and a port for introducing gas or for reducing atmospheric pressure.

Phosphoric acid catalyst (85 weight % in water) was added to the PC solvent with stirring to form an acidic solution. Next, aspartic acid was added to the acidic solution with stirring to form a substantially liquid mixture having the aspartic acid/catalyst weight ratio as shown in Table III.

TABLE III

| Ex. No. | PC Solvent (Grams) | $H_3PO_4$ Catalyst (Grams) | Aspartic Acid (Grams) | Asp/Cat Ratio (w/w) | Atmosphere |
|---|---|---|---|---|---|
| 5 | 15.03 | 1.03 | 3.01 | 3.44 | air |
| 6 | 15.02 | 1.02 | 3.01 | 3.47 | nitrogen |
| 7 | 15.02 | 1.03 | 3.01 | 3.44 | vacuum |

PC = propylene carbonate

In Example 5, the reaction mixture was open to ambient air. The temperature of the reaction mixture was increased to about 165° C. and maintained at that level with stirring for a reaction period of about 3 hours. In Example 6, the procedure of Example 5 was followed except that dry nitrogen gas was flowed over the reaction mixture. In Example 7, the procedure of Example 5 was followed except that the reaction was carried out at a reduced pressure of about −88 kPa.

In each of Examples 5–7, the solids dissolved and formed a homogeneous solution during the polymerization period. At the end of the polymerization period, each reaction mixture was cooled to ambient temperature, about 25° C. Each reaction mixture was then triturated with acetone in an amount of about 250 ml or sufficient to precipitate the product. The precipitated product was recovered by filtration and was washed with water then acetone. The solid was dried in a vacuum oven at a temperature of about 60° C. for about 1 hour.

Each of the products was confirmed as polysuccinimide by IR analysis. The results of analyses for molecular weight analysis, purity, yield and color of the products of Examples 5–7 are shown in Table IV.

TABLE IV

| Ex. No. | Mn | Mw | Mz | % Purity | % Yield | Color |
|---|---|---|---|---|---|---|
| 5 | 2955 | 7159 | 12143 | 99.01 | 87 | light tan |
| 6 | 3250 | 7484 | 12390 | 98.12 | 83.9 | light pink |
| 7 | 5225 | 18693 | 36328 | 99.46 | 87.9 | white |

The data in Table IV show that relatively high yields of polysuccinimide were obtained with a purity approaching about 100%.

The results indicate that the rate of water removal was an important factor in controlling the molecular weight and the other characteristics of the polysuccinimide product. Under atmospheric conditions as in Example 5, the water removal rate was relatively low. Under the inert gas atmosphere in Example 6, water removal proceeded at a somewhat faster rate, and resulted in a product with a weight increase of about 4.5%. Under reduced pressure as in Example 7, the water removal rate was rapid and the resulting Mw increased to more than about 2.5 times over that obtained under atmospheric conditions.

Based on the color of the products in Examples 5 and 6, reaction conditions utilizing an inert gas rather than air favored formation of a lower color product, even though the molecular weights were similar.

EXAMPLES 8–22

Examples 8–22 illustrate the preparation of polysuccinimide in propylene carbonate (PC) solvent (JEFFSOL® PC) by polymerizing aspartic acid under various pressures at aspartic acid/catalyst ratios in the range of about 1/1 w/w to about 36/1 w/w, at a polymerization temperature in the range of about 160° C. to about 190° C. and over a period in the range of about 1 to about 3.25 hours as indicated in Table V.

The following procedure was followed for each of Examples 8–22. The PC solvent was placed in a flask. The flask was equipped with a magnetic stirring bar, a thermometer, a condenser, and a port for introducing gas or for reducing atmospheric pressure.

Phosphoric acid catalyst (85 weight % in water) was added to the solvent with stirring to form an acidic solution. Aspartic acid was added to the acidic solution with stirring to form a reaction mixture having the respective aspartic acid/catalyst ratio (w/w) shown in Table V.

TABLE V

| | Amount in Grams | | | Asp/Cat | Reaction Conditions | | |
|---|---|---|---|---|---|---|---|
| Ex. No. | PC Solvent | $H_3PO_4$* Catalyst | Asparatic Acid | Ratio (w/w) | Temp. (° C.) | Time (Hours) | Atmosphere |
| 8 | 45.04 | 3.08 | 10.03 | 3.83 | 190 | 2 | air |
| 9 | 15.01 | 10.04 | 10.01 | 1.17 | 180 | 1 | nitrogen |
| 10 | 15.01 | 1.01 | 3 | 3.49 | 160 | 1.33 | nitrogen |
| 11 | 15.01 | 1 | 5.01 | 5.89 | 160 | 1.33 | nitrogen |
| 12 | 15.01 | 1.02 | 3.03 | 3.49 | 165 | 1.5 | nitrogen |
| 13 | 15.02 | 0.63 | 3.02 | 5.64 | 165 | 2 | nitrogen |
| 14 | 15.01 | 1 | 7 | 8.24 | 160 | 1 | nitrogen |
| 15 | 15 | 1.01 | 10 | 11.65 | 160 | 2 | nitrogen |
| 16 | 15.04 | 5.02 | 5 | 1.17 | 180 | 1.5 | nitrogen |
| 17 | 25.08 | 0.31 | 5.05 | 19.17 | 165 | 2 | vacuum |
| 18 | 25.08 | 0.31 | 5.05 | 19.17 | 165 | 2 | vacuum |
| 19 | 25.02 | 0.10 | 3 | 35.29 | 165 | 2 | vacuum |
| 20 | 25.01 | 0.12 | 3.02 | 29.61 | 165 | 3 | vacuum |
| 21 | 25.09 | 0.31 | 5.05 | 19.17 | 165 | 3 | vacuum |
| 22 | 250.2 | 3.10 | 50.02 | 18.98 | 170 | 3.25 | vacuum |

PC = propylene carbonate
*85 weight % in water

The atmosphere of the stirred reactor was either ambient air (Ex. 8), inert nitrogen gas (Exs. 9–16), or pressure of about −88 kPa (Exs. 17–22) as indicated in Table V. The temperature of each reaction mixture was increased to the indicated temperature and maintained with stirring over the polymerization period.

Except for Examples 17 and 18, at the end of each respective polymerization period, the temperature of the reaction mixture was cooled to ambient room temperature, about 25° C. The reaction mixture was triturated with acetone in an amount of about 250 ml or sufficient to precipitate the product. The precipitate was recovered by filtration and was washed with water then acetone. The solid was dried in a vacuum oven at a temperature of about 60° C. for about 1 hour.

Upon cooling to room temperature, some of the reaction product precipitated and was examined separately. This precipitate and the remaining material were treated as described in the method of Example 17. The results are shown as two separate data entries (Example 17 and 18) in Table VI.

For the first fraction identified in Tables V and VI as Example 17, a portion of the reaction mixture was collected, then the product was precipitated with acetone, washed, dried, and then characterized. For the second fraction identified in Tables V and VI as Example 18, a portion of the reaction mixture of Example 17 was collected, the reaction product was precipitated with acetone, then dried, washed, further dried, and characterized. The data obtained from each of these separate fractions are shown in Table VI.

In each of Examples 8–22, all of the solid reactants dissolved and formed homogeneous solutions at reaction temperature.

In each of Examples 8–22, the reaction product was confirmed by IR analysis as being polysuccinimide. The resulting molecular weight analysis (Mn, Mw, Mz), purity, yield and color for each product obtained in Examples 8–22 are shown in Table VI.

TABLE VI

| Ex. No. | Mn | Mw | Mz | % Purity | % Yield | Color |
|---|---|---|---|---|---|---|
| 8 | 2269 | 5905 | 9981 | 96.23 | 96.8 | light yellow |
| 9 | 1897 | 6035 | 11209 | 97.82 | 95.6 | yellow |
| 10 | 3753 | 12745 | 23415 | 97.95 | 94.1 | white |
| 11 | 2846 | 10114 | 18719 | 97.05 | 96 | white |
| 12 | 4390 | 15020 | 29787 | 98.88 | 93.6 | white |
| 13 | 5059 | 18064 | 35768 | 99.46 | 93.1 | white |
| 14 | 3755 | 12376 | 22150 | 98.79 | 82.1 | white |
| 15 | 3548 | 12463 | 23207 | 98.87 | 98 | light pink |
| 16 | 2674 | 8319 | 14907 | 98.9 | 88.7 | yellow |
| 17* | 4307 | 14629 | 31434 | 98.39 | 51 | white |
| 18* | 6564 | 44924 | 88842 | 76.09 | 40 | white |

TABLE VI-continued

| Ex. No. | Mn | Mw | Mz | % Purity | % Yield | Color |
|---|---|---|---|---|---|---|
| 19 | 1926 | 4412 | 7956 | 96.68 | 45.3 | light yellow |
| 20 | 1973 | 5047 | 13027 | 96.92 | 97.8 | light yellow |
| 21 | 5307 | 26125 | 64429 | 99.31 | 89.5 | white |
| 22 | 6053 | 34157 | 119182 | 98.9 | 91.1 | light yellow |

*Results from two fractions during isolation.

EXAMPLES 23–27

Examples 23–27 illustrate the preparation of polysuccinimide in ethylene carbonate (EC) solvent (JEFFSOL® EC, Huntsman Corporation, Austin, Texas) by polymerizing aspartic acid under an atmosphere of either inert gas (anhydrous nitrogen) (Exs. 23–26) or reduced pressure (about −88 kPa) (Ex. 27), at aspartic acid/catalyst ratios in the range of about 3.5/1 w/w to about 12/1 w/w, at a reaction temperature in the range of about 165° C. to about 180° C. over a time period in the range of about 1.5 to about 2 hours, as indicated in Table VII.

TABLE VII

| | Amount in Grams | | | Asp/Cat | Reaction Conditions | | |
|---|---|---|---|---|---|---|---|
| Ex. No. | PC Solvent | H₃PO₄* Catalyst | Asparatic Acid | Ratio (w/w) | Temp. (° C.) | Time (Hours) | Atmosphere |
| 23 | 15.13 | 1 | 3.25 | 3.82 | 180 | 1.5 | nitrogen |
| 24 | 15.12 | 0.52 | 3.01 | 6.81 | 180 | 1.5 | nitrogen |
| 25 | 25.01 | 0.51 | 5 | 11.53 | 180 | 1.5 | nitrogen |
| 26 | 25.25 | 0.54 | 5 | 10.89 | 165 | 2 | nitrogen |
| 27 | 15.18 | 0.53 | 5.02 | 11.14 | 165 | 2 | vacuum |

*85 weight % in water

The general procedure employed in Examples 8–22 was followed except that the specific conditions were as indicated in Table VII.

In each of the Examples 23–27 all of the solids dissolved during the reaction period forming homogeneous solutions. The reaction products were confirmed by IR as being polysuccinimide. The molecular weight analysis (Mn, Mw, Mz), purity, yield and color for the products obtained in Examples 24–27 are shown in Table VIII.

TABLE VIII

| Ex. No. | Mn | Mw | Mz | % Purity | % Yield | Color |
|---|---|---|---|---|---|---|
| 23 | 1612 | 4722 | 9659 | 98.88 | 86.4 | white |
| 24 | 1556 | 4332 | 8508 | 98.79 | 86.4 | light yellow |
| 25 | 1455 | 3818 | 7240 | 99.15 | 87.8 | white |
| 26 | 1538 | 4149 | 8183 | 99.06 | 91 | white |
| 27 | 1503 | 4813 | 21138 | 92.29 | 81.6 | white |

The data show that polysuccinimide of relatively low color and having a Mw in the range of about 3,500 to about 5,000 was produced in relatively high yields by the catalytic polymerization of aspartic acid in ethylene carbonate.

EXAMPLE 28

This example illustrates the catalytic preparation of polysuccinimide in butylene carbonate (BC) solvent (Huntsman Corporation, Austin, Tex.) having a boiling point of about 250° C.

A reactor flask of 50 ml capacity was equipped with a magnetic stirring bar and a thermometer. The reactor contents were exposed to ambient air.

To the stirred reactor were sequentially added 15.03 grams of BC solvent and 1.02 grams of phosphoric acid catalyst (85 weight % in water) providing an acidic solution. Aspartic acid in an amount of about 3.01 grams was added to the acidic solution with stirring, the aspartic acid/catalyst ratio of about 3.47/1 w/w.

The temperature of the reaction mixture was elevated to about 180° C. and maintained under stirring for a polymerization period of about 1.33 hours. During this polymerization period, all solids in the reaction mixture dissolved and formed a homogeneous solution.

The reaction mixture was then cooled to ambient temperature, about 25° C. The reaction mixture was triturated with acetone in about 250 ml to precipitate the product. The precipitate was recovered by filtration and was washed with water then acetone. The product was dried in a vacuum oven at a temperature of about 60° C. for about 1 hour.

The product was confirmed as being polysuccinimide by IR analysis. The polysuccinimide was light brown in color and of about 91.56% purity. The yield was about 84.7% of the theoretical amount. The molecular weight was relatively low, having a Mn of about 1,974 a Mw of about 5,347 and a Mz of about 9,241.

EXAMPLE 29–30

Examples 29–30 illustrate the use of a polyphosphoric acid catalyst in the preparation of polysuccinimide in propylene carbonate (PC) solvent by polymerizing aspartic acid under anhydrous nitrogen gas.

The general procedure employed in Examples 1–4 was followed except that the amount of propylene carbonate, aspartic acid, and polyphosphoric acid (Aldrich Chemical, Milwaukee, Wis.) employed were as indicated in Table IX, and that the polymerization reaction was carried out for about 1 hour.

In Examples 29 and 30, the products were confirmed as being polysuccinimide by IR analysis with the respective molecular weight, purity, yield, and color were as shown in Table X.

TABLE X

| Ex. No. | Mn | Mw | Mz | % Purity | % Yield | Color |
|---|---|---|---|---|---|---|
| 29 | 3556 | 11580 | 21597 | 99.05 | 84.2 | white |
| 30 | 2771 | 8372 | 17246 | 99.17 | 83.3 | light yellow |

EXAMPLES 31–37

Examples 31–37 illustrate the use of the sulfur trioxide catalysts to prepare polysuccinimide in propylene carbonate solvent from aspartic acid under an inert gas atmosphere. The catalysts sulfur trioxide pyridine complex (98% purity) in Ex. 31, sulfur trioxide N,N-dimethylformamide (DMF) complex (97% purity) in Ex. 32, ammonium bisulfate in Ex. 33, methane sulfonic acid (99% purity) in Ex. 34, and potassium pyrosulfate ($K_2S_2O_7$, 99.9% purity) in Exs. 35–37 were utilized.

The general procedure employed in Examples 1–4 was used with the conditions indicated in Table XI.

TABLE XI

| Ex. No. | Grams PC Solvent | Catalyst | Grams Catalyst | Grams Aspartic Acid | Asp/Cat Ratio (w/w) | Reaction Temp. (° C.) | Reaction Time (Hours) |
|---|---|---|---|---|---|---|---|
| 31 | 25.07 | SO$_3$-Pyridine complex (98%) | 0.53 | 5.05 | 9.72 | 170 | 1 |
| 32 | 25.01 | SO$_3$-DMF complex (97%) | 0.52 | 5.02 | 9.95 | 170 | 1 |
| 33 | 25.06 | NH$_4$HSO$_4$ | 1.01 | 5.01 | 4.96 | 170 | 1 |
| 34 | 25.01 | Methane-sulfonic Acid (99%) | 1.01 | 5.06 | 5.06 | 175 | 1 |
| 35* | 25.1 | K$_2$S$_2$O$_7$ | 0.5 | 5.02 | 10.04 | 175 | 2 |
| 36* | 25.1 | K$_2$S$_2$O$_7$ | 0.5 | 5.02 | 10.04 | 175 | 2 |
| 37 | 25.03 | K$_2$S$_2$O$_7$ | 0.5 | 5 | 10 | 180 | 1 |

TABLE IX

| | | Amount in Grams | | | |
|---|---|---|---|---|---|
| Ex. No. | PC Solvent | Polyphosphoric Acid Catalyst | Aspartic Acid | Asp/Cat Ratio (w/w) | Reaction Temp (° C.) |
| 29 | 25.01 | 1.01 | 5.01 | 4.96 | 175 |
| 30 | 25.1 | 1.05 | 5.02 | 4.78 | 170 |

PC = propylene carbonate (JEFFSOL ® PC, Huntsman Corporation, Austin, Texas)

In Examples 31–37, the reaction products were confirmed as polysuccinimide by IR analysis with the molecular weight, purity, yield, and color shown in Table XII.

TABLE XII

| Ex. No. | Mn | Mw | Mz | % Purity | % Yield | Color |
|---|---|---|---|---|---|---|
| 31 | 3510 | 14008 | 35011 | 97.9 | 81.8 | tan |
| 32 | 3036 | 8842 | 18026 | 98.62 | 83.4 | light tan |
| 33 | 2691 | 8500 | 16843 | 97.12 | 84.2 | light tan |
| 34 | 1529 | 4676 | 11472 | 94.79 | 79 | light yellow |

TABLE XII-continued

| Ex. No. | Mn | Mw | Mz | % Purity | % Yield | Color |
|---|---|---|---|---|---|---|
| 35 | 3458 | 9817 | 21421 | 99.13 | 55 | light tan |
| 36 | 5287 | 23943 | 54748 | 97.76 | 34 | light tan |
| 37 | 3449 | 14692 | 36411 | 94.44 | 79.1 | light yellow |

*Results from two fractions during isolation.

EXAMPLES 38–39

Examples 38–39 illustrate the use of catalytic mixtures of potassium pyrosulfate and polyphosphoric acid in the preparation of polysuccinimide from aspartic acid in either propylene carbonate (Ex. 38) or in ethylene carbonate (Ex. 39) solvent under an inert gas atmosphere. The general procedure of Examples 1–4 was followed with the conditions as shown in Table XIII.

TABLE XIII

| Ex. No. | Grams Solvent | Catalyst | Grams Catalyst | Grams Aspartic Acid | Asp/Cat Ratio (w/w) | Reaction Temp. (° C.) | Reaction Time (Hours) |
|---|---|---|---|---|---|---|---|
| 38 | 25.04 PC | $K_2S_2O_7$ Polyphosphoric Acid | 0.38 0.38 | 5.01 | 13.18 13.18 | 175 | 1.5 |
| 39 | 25.01 EC | $K_2S_2O_7$ Polyphosphoric Acid | 0.36 0.36 | 5.02 | 13.94 13.94 | 170 | 1.5 |

PC = propylene carbonate (JEFFSOL ® PC, Huntsman Corporation, Austin, Texas)
EC = ethylene carbonate (JEFFSOL ® EC, Huntsman Corporation, Austin, Texas)

In Examples 38–39, the reaction product was confirmed as polysuccinimide by IR analysis. The molecular weight, purity, yield, and color are shown in Table XIV.

TABLE XIV

| Ex. No. | Mn | Mw | Mz | % Purity | % Yield | Color |
|---|---|---|---|---|---|---|
| 38 | 3541 | 13229 | 32409 | 98.9 | 92.1 | light tan |
| 39 | 1649 | 5146 | 10216 | 94.65 | 79.5 | light pink |

Examples 1–39 illustrate that quantitative conversion of aspartic acid monomer to polysuccinimide in solution can be done in a one-pot process by specifying reaction conditions. The polysuccinimide had a weight average molecular weight (Mw) in the range of from about 3,000 to about 50,000. The polysuccinimide product can be obtained in relatively high yields and of high purity with simple recovery techniques.

EXAMPLE 40

An experiment was performed to demonstrate that aspartic acid would not polymerize in the absence of a catalyst under reaction conditions. The procedure of Example 7 was followed, except that 5.04 g aspartic acid was suspended in 25.08 g propylene carbonate, then heated to about 165° C. for about 1 hour under vigorous agitation and a pressure of about −88 kPa.

The solid aspartic acid did not dissolve during the reaction period but the reaction mixture was treated as it was in other examples by triturating with acetone, filtering, washing, and drying. Monomeric aspartic acid was identified by IR analysis. A majority of the aspartic acid reactant was recovered (solid weight was about 4.9 g out of 5.04 g). This experiment proved that no detectable polymerization of aspartic acid had occurred in the propylene carbonate solvent in the absence of catalyst or dehydrating agent.

EXAMPLES 41–48

Each of Examples 41–49 illustrates the preparation of co-polymers of aspartic acid with another poly(carboxylic acid) to produce succinimide copolymers in propylene carbonate (PC) solvent (JEFFSOL PC) by catalytically co-polymerizing aspartic acid with a co-monomer employing phosphoric acid at a w/w ratio of aspartic acid/catalyst varying from 2/1 to about 6/1 under reduced pressure as indicated below in Table XV. The co-monomer was either tartaric acid (Ex. Nos. 41–43); citric acid (Ex. Nos. 44-45); 1,2,3,4-butanetetracarboxylic acid (Ex. Nos. 46–47); or adipic acid (Ex. Nos. 48–49).

In each of Examples 41–49, the following procedure was employed with the respective amounts and reaction conditions indicated in Table XV.

The PC solvent (about 50 grams) was placed in reactor flask of about 250 ml capacity which was equipped with a magnetic stirring bar, thermometer, water removal condenser and a port for reducing the atmospheric pressure to carry out the reaction at about 200 to about 250 mm Hg absolute pressure.

Phosphoric acid (85 weight % in water) catalyst then was added to the PC solvent with stirring to form an acidic solvent solution. Next, aspartic acid and the co-monomer indicated in Table XV each were added sequentially to the acidic solvent solution and suspended therewith with stirring to form a reaction mixture having the aspartic acid/catalyst weight ratio as shown in Table XV.

The temperature of the reaction mixture was then increased to a range of about 165° to about 170° C. as indicated in Table XV and so maintained with stirring for a reaction period of about 1.5 hours to about 2 hours also as indicated in Table XV.

In each of Examples 41–49, the solids dissolved and the liquid reaction mixture formed a substantially homogeneous true solution during the co-polymerization reaction period.

At the end of the polymerization reaction period, the temperature of each of the reaction mixtures was cooled to ambient room temperature. Each cooled reaction mixture was then triturated with acetone in an amount of about 500 ml or sufficient to precipitate the reaction product. The precipitated reaction product was then recovered by filtration. The recovered solid isolate was sequentially washed separately with water and with acetone.

The washed solid reaction product was dried in an oven at a temperature of about 80° C. for a period of from about 4 to about 24 hours.

Each one of the dried reaction products was confirmed as a succinimide copolymer by IR analysis. The determined molecular weight analysis and color of the products of Examples 41–49 are shown in Table XV. The yields obtained were judged substantially quantitative.

TABLE XV

| Ex. No. | Grams Aspartic Acid | Co-Monomer | Grams Co-Monomer | Grams H$_3$PO$_4$ Catalyst | Asp/Cat Ratio (w/w) | Reaction Temp. (° C.) | Reaction Time (Hours) | Mw | Color |
| --- | --- | --- | --- | --- | --- | --- | --- | --- | --- |
| 41 | 9 | Tartaric Acid | 1.01 | 1.6 | 5.63 | 165 | 1.5 | 2288 | light yellow |
| 42 | 7.5 | Tartaric Acid | 2.5 | 2.03 | 3.69 | 165 | 1.5 | 978 | dark tan |
| 43 | 5 | Tartaric Acid | 5 | 2.03 | 2.46 | 165 | 1.5 | 694 | dark tan |
| 44 | 9.02 | Citric Acid | 1.02 | 1.62 | 5.57 | 168 | 1.83 | 2440 | white |
| 45 | 7.53 | Citric Acid | 2.55 | 2.11 | 3.57 | 165 | 2 | 1163 | yellow-white |
| 46 | 9.02 | 1,2,3,4-Butanetetra-carboxylic Acid | 1.05 | 1.66 | 5.43 | 170 | 2.1 | 2901 | bright yellow |
| 47 | 7.52 | 1,2,3,4-Butanetetra-carboxylic Acid | 2.51 | 2.07 | 3.63 | 167 | 1.9 | 1616 | bright white |
| 48 | 9 | Adipic Acid | 1 | 1.63 | 5.52 | 170 | 1.8 | 7040 | bright white |
| 49 | 7.55 | Adipic Acid | 2.51 | 2.12 | 3.56 | 170 | 2 | 3185 | bright white |

As shown by the data in Table XV, succinimide copolymers were produced by solvent copolymerization of aspartic acid with another monomer. The obtained products had varying Mw and color characteristics.

We claim:

1. A succinimidcopolymer produced by a solution polymerization method which comprises the steps of:

forming in a cyclic carbonate solvent a substantially liquid reaction mixture constituted by aspartic acid, a copolymerizable monomer soluble in the solvent and having a functionality of at least 2, and at least one catalyst;

heating said reaction mixture to an elevated temperature sufficient to produce a heated reaction mixture and to effect solution polymerization of said aspartic acid with said monomer, said temperature being below the boiling point of said cyclic carbonate solvent; and maintaining the heated reaction mixture at said reaction temperature until a succinimide copolymer product is formed; and characterized by having a weight average molecular weight in the range of about 200 to about 50,000.

* * * * *